April 25, 1933.  E. BURKE  1,905,794

CONDUIT FOR SUBWAY CABLES

Filed April 5, 1928

Inventor:
Edmund Burke
by
Attys.

Patented Apr. 25, 1933

1,905,794

UNITED STATES PATENT OFFICE

EDMUND BURKE, OF PORTLAND, MAINE, ASSIGNOR TO BROWN COMPANY, OF BERLIN, NEW HAMPSHIRE, A CORPORATION OF MAINE

CONDUIT FOR SUBWAY CABLES

Application filed April 5, 1928. Serial No. 267,595.

This invention relates to a means for enclosing power cables and the like, which have heretofore been extended along a side wall of the subway and supported on brackets, in protective conduit surrounded by concrete or equivalent material suitable for localizing trouble in any of the power cables and preventing failure or short-circuit of one cable from damaging adjacent cables. To this end, I provide longitudinally split conduit, each section comprising two pieces which fit together to make a complete cylindrical tube. These pieces can be placed about cables which have been previously installed and in service, the assembled sections of conduit resting on the brackets originally provided for the support of the cables. When a conduit has been assembled and secured around each of the cables, the conduits may then be surrounded by and enclosed in a mass of concrete or equivalent material which effectively isolates the several cables so that a short-circuit in the circuit of which one of the cables is a part will not result in injury to other adjacent cables.

For a more complete understanding of the invention, reference is had to the description of the invention which follows, and to the drawing, of which,—

Figure 1:
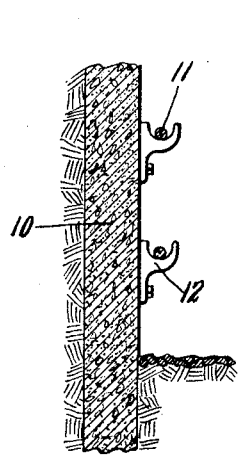
Figure 1 represents in section a portion of a side wall of a subway passage showing a pair of cables supported by brackets thereon.
Figure 2:
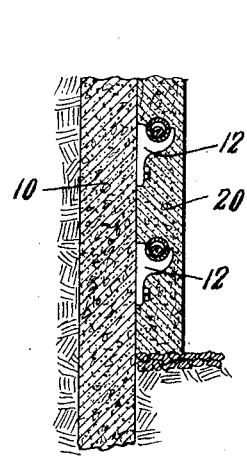
Figure 2 represents the same cables enclosed in conduit structure installed according to the invention.

Referring to the drawing in detail, 10 represents a side wall of a subway passage. According to common usage, electric power cables 11 are frequently strung along such a wall, being supported as by suitable brackets 12. The cables customarily consist of a conductor 13 surrounded by suitable insulating material 14. This manner of supporting power cables is objectionable since a short circuit of one cable is liable to fuse the metal therein, the molten metal sometimes dropping on other adjacent cables and injuring them so that the failure of one of a number of parallel cables may result in the burning out of the entire group with consequent loss and delay. In order to isolate or segregate the individual cables in such a manner as to localize any trouble which may arise in one of them, I provide a method for encasing the cables in separate ducts formed in a solid concrete structure so that the cables may be removed and replaced later if desired. To this end, I provide sections of fiber conduit, each section being longitudinally split into two pieces 15 and 16, these two pieces being capable of fitting together so as to form a complete cylindrical tube. For the purposes of the invention, I prefer to use conduit which is made of interfelted fibers saturated with a suitable waterproofing liquid such as molten pitch or asphalt. Such conduit may be made by rolling a sheet of wet cellulosic pulp on itself under pressure so that the successive convolutions interfelt with one another to form a wall structure which is comparatively light but strong when suitably dried. The strength, rigidity and insulating qualities of such a structure is increased by saturation in a suitable waterproofing compound. Such conduits are desirable by reason of their comparative lightness which renders them easy to manipulate, and by reason of their comparative strength and cheapness.

Figure 3:
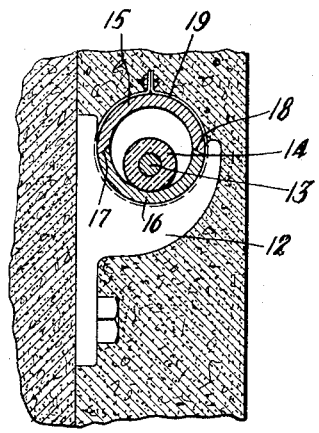
Figure 3 shows a portion of Figure 2 on a larger scale.
Figure 4:
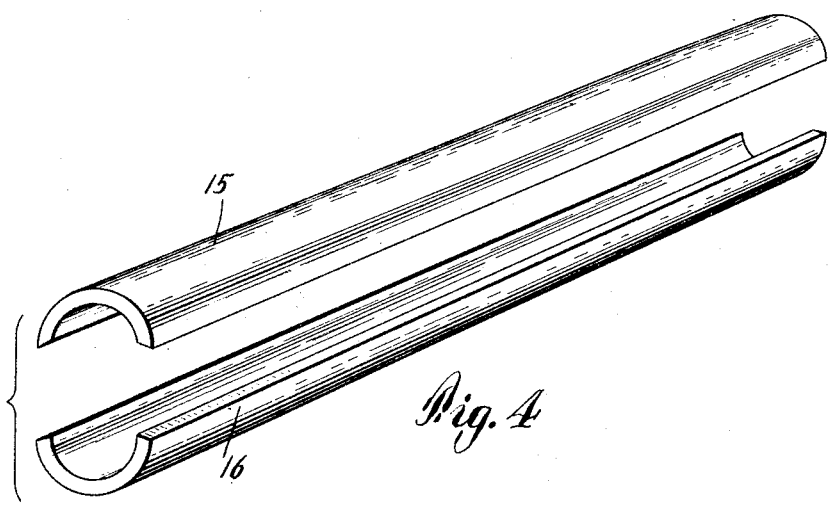
Figure 4 is a perspective view of a section of conduit tubing split into two pieces.
Figure 5:
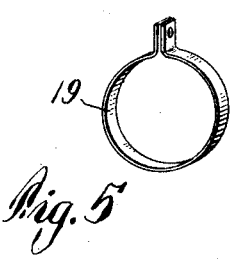
Figure 5 is a perspective view of a collar suitable for securing the pieces of a conduit section together.

The slits by which the section is separated into two parts may be radial or as shown in Figure 3 at angles to the radial. As shown, the slits 17 and 18 are so formed that when the conduit is laid horizontally with the piece 15 resting on the piece 16, the butt edges at the slits 17 and 18 slope outwardly and downwardly. As a result the upper piece 15 fits on the lower piece 16 in such a way as to rest securely thereon without being easily displaced therefrom and to prevent the infiltration or moisture from wet concrete which may be poured around the conduit to form an enclosing structure therefor. In order to enclose the cables 11 in conduit sections, the cables are each lifted from their brackets sufficiently to slip a conduit piece 16 thereunder, these conduit pieces being supported by the brackets 12. The conduit pieces 15 are then placed on the pieces 16 so as to complete the enclosure of the cables in the conduit sections. In order to secure the pieces 15 and 16 together, any tie members such as a metal band 19 may be bolted or otherwise secured about the conduit at suitably spaced points. The bands 19 may if desired be of sufficient width to span the abutting end portions of successive conduct sections so as to aline successive sections and to cover the cracks between the abutting end faces. Any other desired means, however, may be used for this purpose, such for example as tape or the like. When the sections of conduit have been assembled around the cables in end-to-end relationship so as to form continuous conduits enclosing the cables, they may be walled in as by concrete or any other suitable plastic poured around the conduits as at 20, this concrete forming a solid mass effectually isolating the several cables and thus localizing any failure or other trouble which may arise in any one cable.

Having thus described certain embodiments of this invention, it should be evident to those skilled in the art that various changes and modifications might be made therein without departing from its spirit or scope as defined by the appended claims.

I claim:—

1. In combination with a wall and cable-supporting brackets thereon, a longitudinally split fiber conduit on said brackets, and means for holding the split conduit portions together, said means including a monolithic concrete structure enclosing said brackets and conduit and abutting said wall.

2. In combination with a wall, a series of brackets and a cable supported thereby, a longitudinally split fiber conduit on said brackets enclosing said cable, and means for holding the split portions together, said means including a concrete monolithic structure enclosing said brackets and conduit and abutting said wall.

3. In combination with a wall and cable-supporting brackets thereon, a longitudinally split fiber conduit consisting of two piece sections having abutting edges at the splits sloping outwardly and downwardly when the sections are horizontally laid, clamping means about each section, and a monolithic concrete structure enclosing said brackets and conduit and abutting said wall.

In testimony whereof I have affixed my signature.

EDMUND BURKE.